United States Patent Office 3,525,915
Patented Aug. 25, 1970

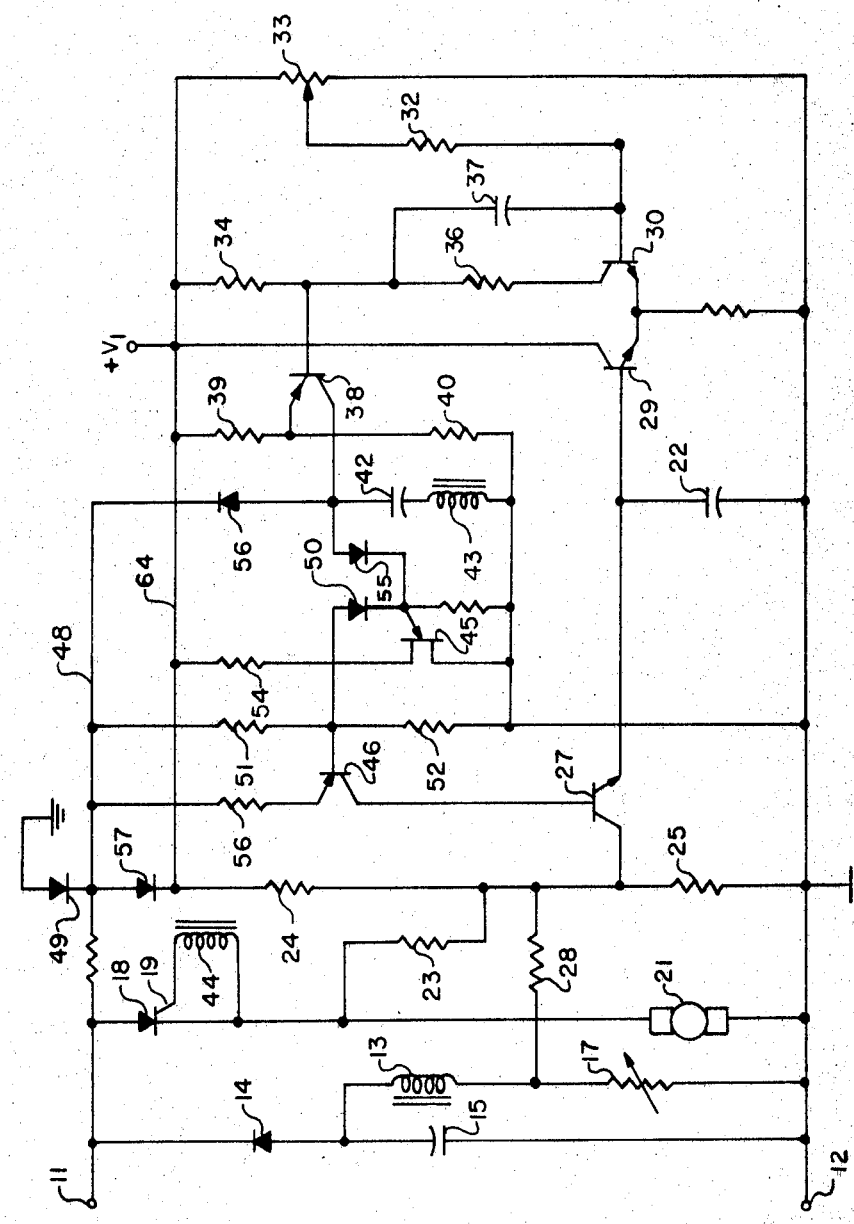

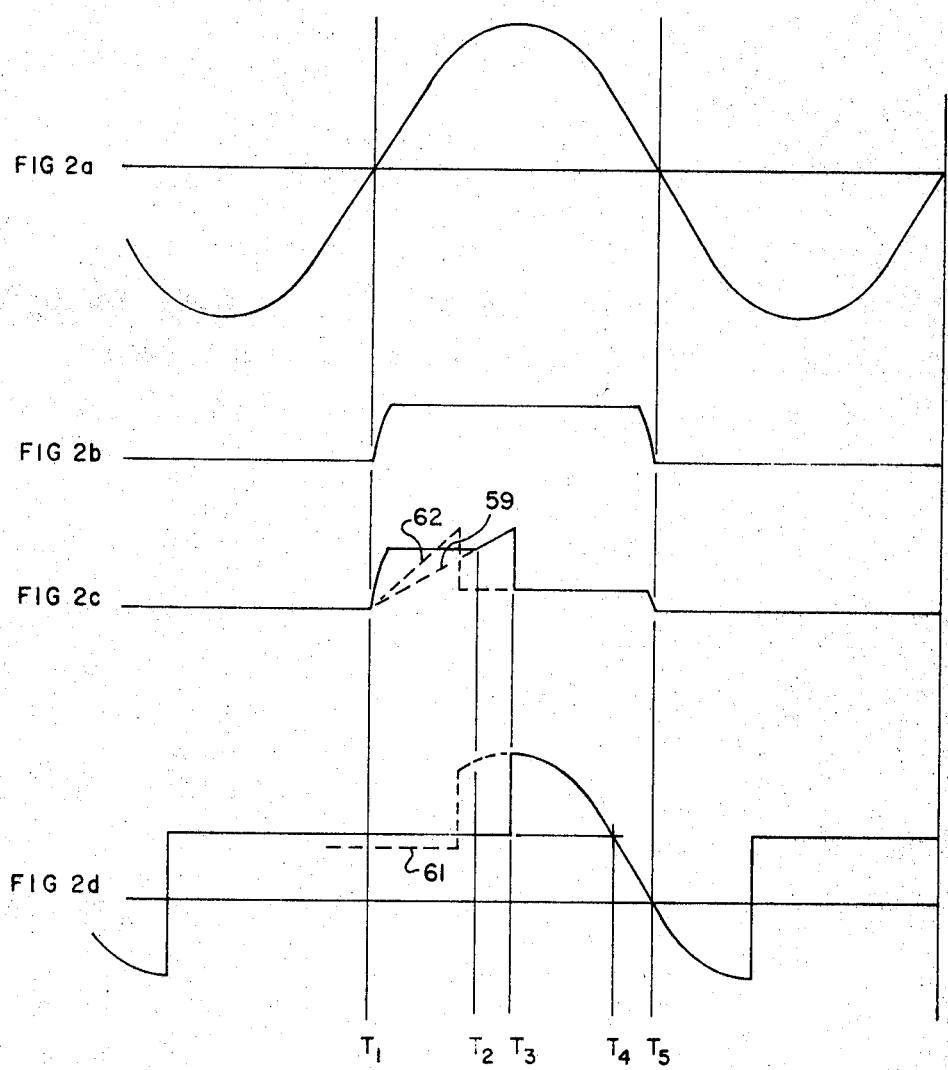

3,525,915
SPEED CONTROL FOR D.C. MOTORS WITH COUNTER EMF SAMPLING CIRCUIT
Le Roy Barter, Fullerton, Calif., assignor to Beckman Instruments, Inc., a corporation of California
Filed Aug. 26, 1968, Ser. No. 755,148
Int. Cl. H02f 7/28
U.S. Cl. 318—341          5 Claims

ABSTRACT OF THE DISCLOSURE

A D.C. motor control circuit is disclosed in which a full half-cycle is available for recovery of the armature transients. A pulse forming circuit biases a switch conductive at the beginning of half-waves of a common polarity to connect a voltage signal proportional to the counter-EMF of the armature to a differential amplifier. The output of the differential amplifier controls the rate of charging of a capacitor in accordance with the deviation of the motor speed from a desired value. When the capacitor voltage reaches a predetermined value a unijunction transistor is biased conductive to discharge the capacitor through the primary winding of a transformer. The resulting pulse in the secondary fires a SCR connected in series across the line with the motor armature. At the same time the unijunction transistor conducts the first mentioned switch is opened to end the sampling of the counter-EMF.

---

This invention relates generally to motor control circuits and more particularly to circuits for regulating the speed of a direct current motor over a wide speed range by controlling the duration of voltage pulses applied to the motor armature.

Numerous types of motor speed regulators have been devised for the purpose of accurately controlling the speed of a direct current motor despite fluctuations in the load being driven. One type of regulator employs a normally nonconducting gating or switching device such as a silicon controlled rectifier (SCR), connected in series with the armature of the motor powered by a unidirectional voltage having periodic pulses or variations such as the signal produced by a half-wave rectified alternating current. An indication of the motor speed has, in the past, been derived either from a tachometer connected to the motor or by using the counter-EMF developed across the motor armature. This signal is compared with a reference signal to develop an error signal utilized to control the time of operation of the switching device to vary the duration of voltage pulses applied to the motor armature and thereby controlling the motor speed for varying load conditions.

In those regulator circuits sensing the counter-EMF developed across the motor armature it has been the general practice to sense the counter-EMF over a fixed period of time during which the motor is free wheeling. If the conditions are such that the armature has a large inductance, the time available for measuring the counter-EMF is decreased and poor control of the motor results. This condition usually exists when the motor is running slow with a large load.

It is therefore an over-all object of the present invention to provide a direct current motor speed regulator capable of controlling speed over a large range under varying torque conditions.

It is a more specific object of the present invention to provide a direct current motor speed regulator which allows a maximum time interval for recovery of the armature transients.

Other objects and many of the attendant advantages of this invention will become better understood by reference to the following detailed description when read in connection with the accompanying drawings and wherein:

FIG. 1 is a circuit schematic of an embodiment of the invention which provides a full half-cycle for decay of the armature transients; and FIG. 2 shows various waveforms which illustrate the operation of the circuit of FIG. 1.

Referring now to FIG. 1 of the drawings, a half-wave rectified voltage derived from an alternating current source connected across input terminals 11 and 12, such as a 115 volt, 60 Hz. source, is applied to the field winding 13 by way of a half-wave rectifier such as diode 14 and filter capacitor 15. The magnitude of the field current may be adjusted with variable resistor 17 connected in series with the field winding. Also connected across the 60 Hz. line is the series combination of a silicon controlled rectifier (SCR) 18 having a gate 19 and the motor armature 21.

During the interval of time when SCR 18 is not passing load current to the armature and the inductive currents have decreased to an insignificant amount, the counter-EMF developed across the armature is proportional to motor speed if the field current is constant. This counter-EMF is stored across capacitor 22 via the resistance network 23, 24, 25 and switching transistor 27. Resistors 24 and 25 are connected as a divider network between a source of positive D.C. potential $V_1$ and circuit ground, the junction of resistors 24 and 25 being connected to the collector of switching transistor 27 and through resistor 23 to one side of the armature 21. Since the counter-EMF of the armature is also proportional to the field flux which in turn depends upon the field current, a voltage proportional to the field current is also connected to the collector of switching transistor 27 via resistor 28 connected to the junction of field winding 13 and variable resistor 17.

The voltage across capacitor 22 which is proportional to the motor speed is applied to the base of transistor 29 connected with transistor 30 to form a D.C. differential amplifier. The base of transistor 30 is connected through resistor 32 to the slider of potentiometer 33 connected between the source of D.C. voltage $V_1$ and circuit ground. As is well known, the differential amplifier produces an output voltage across resistor 34 which is proportional to the difference between the voltages applied to the bases of transistors 29 and 30. Since the voltage to the base of transistor 30 may be varied by means of potentiometer 33, this potentiometer may be utilized to set any desired motor speed. The combination of resistor 36 and capacitor 37 operate to provide a control of the dynamic response of the system. Resistor 36 also provides a current limiting device to prevent malfunction of the unijunction transistor hereinafter described.

Transistor 38 and resistors 39 and 40 provide a voltage-to-current converter for charging capacitor 42 at a rate dependent upon the difference between the signals at the bases of transistors 29 and 30. The output signal of the differential amplifier produced across resistor 34 is connected to the base of transistor 38 having its emitter connected to the junction of resistors 39 and 40 which form a potential divider connected between the source of D.C. potential and circuit ground. The collector of transistor 38 is connected to one side of the capacitor 42 which is connected in series with the primary winding 43 of a transformer having its secondary winding 44 connected to the gate 19 of SCR18. Potential dividers 39 and 40 serve to bias the emitter of transistor 38 so that the collector current can be reduced to zero while transistor 30 of the differential amplifier is still conducting in its linear range.

The unijunction transistor 45, transistor 46 and transistor switch 27 and the associated components provide a dual function; first, they provide a time controlled switch for measuring the counter-EMF of the armature 21 as hereinbefore described, and second, they provide a phase modulated pulse which is applied to the gate 19 of SCR 18 to turn on the SCR.

During the negative half-cycle of the alternating voltage applied to terminals 11 and 12, line 48 is clamped at substantially zero volts by diode 49. The emitter of unijunction transistor 45 is held below its firing potential because diode 50 has its anode held at ground potential via the potential divider resistors 51, 52 and because the anode of diode 55 is held at substantially ground potential by diode 56. Resistor 54 is connected in series with the base electrode of unijunction transistor 45 and positive supply line 64.

The operation of the circuit of FIG. 1 may be best understood by reference to the waveforms illustrated in FIG. 2 wherein FIG. 2a represents the line voltage applied across terminals 11 and 12, FIG. 2b illustrates the pulsed voltage on line 48, FIG. 2c illustrates in solid line the potential at the emitter of unijunction transistor 45 and in dotted fashion the charge on capacitor 42 and FIG. 2d illustrates the voltage across the armature 21 of the motor, all as a function of time. It should be understood that the voltage scales for the figures do not necessarily correspond one to the other and are utilized merely to show the general shape of the waveforms as a function of time.

As previously stated, during the negative half-cycle of the line voltage, the line 48 is clamped at substantially zero volts by diode 49 as illustrated in FIG. 2b. The emitter-base junction of transistor 46 is biased by resistors 51, 52 and 56 such that the base collector junction is forward biased and switching transistor 27 is cut off. The emitter of unijunction transistor 45 is below its firing potential because diode 50 and the junction of the collector of transistor 38 and capacitor 42 is held at substantially zero volts by diode 56. This ensures that the capacitor 42 contains no residual charge at the beginning of the reference cycle. Assuming that the motor has been running at least a few revolutions the charge on capacitor 22 will be substantially the same as the counter-EMF across the armature 21. Under these conditions a voltage signal appears across resistor 34 but since the collector of transistor 38 is clamped at zero volts by diode 56 no charging of capacitor 42 is affected.

As the line voltage swings positive at $T_1$ line 48 is clamped at slightly above the potential of $V_1$ by diode 57 as illustrated in FIG. 2b. This pulse biases transistor 46 on which provides a constant current to the base of transistor 27, turning this transistor switch on. The capacitor 22 is charged to the potential of the counter-EMF of the motor armature. The positive pulse on line 48 is also applied to the cathode of diode 56 cutting off this diode and capacitor 42 begins to charge at a rate dependent upon the collector current of transistor 38 as shown by the dashed line 59 in FIG. 2c. The collector current of transistor 38 is of course determined by the voltage across the resistor 34 which is dependent upon the difference between the charge on capacitor 22 representing the speed of the motor and the input to the base 30 which represents the desired speed. Thus any increase or decrease in the desired speed causes a change in voltage across resistor 34 which changes the rate of charging of capacitor 42 as will be hereinafter more fully explained. The emitter of unijunction transistor 45 is held at a potential of about 2 volts below its firing potential by the bias established across the resistors 51 and 52 and applied through diode 50 to the emitter. The emitter voltage is shown in FIG. 2c by the solid line.

During the period when capacitor 42 is charging, diode 55 is reverse biased until the capacitor potential reaches that being applied to the emitter of unijunction transistor 45 through diode 50. At time $T_2$ the potential on capacitor 42 reaches that applied to the emitter of unijunction transistor 45 and diode 55 becomes forward biased. The emitter of unijunction potential 45 begins to rise as the charge on capacitor 42 increases until time $T_3$ when the firing potential is reached.

At time $T_3$ the unijunction transistor 45 fires which, as hereinbefore stated, operates to open switching device 27 and initiate conduction of SCR 18.

When unijunction transistor 45 fires the emitter potential drops to slightly above circuit ground and draws current through diode 50 causing the potential at the base of transistor 46 to become negative with respect to the potentials on capacitor 22 and the junction of resistors 24 and 25 forward biasing the collector base junction of transistor 46 which turns transistor 27 off to end the sampling. At time $T_3$ when the emitter potential of unijunction transistor 45 drops to a low value capacitor 42 quickly discharges through diode 55 and the emitter-base junction of unijunction transistor 45 causing a pulse to pass through the transformer 43, 44 which fires SCR 18 applying the line potential to armature 21 as illustrated in FIG. 2d.

At time $T_4$ the current through SCR 18 begins to decrease and goes to zero at a rate depending upon the inductance in the armature 21. When the current decreases below the holding current of SCR 18, the SCR cuts-off and the potential across the armature assumes its counter-EMF value as indicated in FIG. 2d. As the line voltage decreases to zero at time $T_5$ diode 56 again serves to clamp the junction of the collector of transistor 38 and capacitor 42 at circuit ground and any residual charge on the capacitor is drained off. The unijunction transistor 45 turns off because line 48 potential has dropped to zero.

For conditions requiring more torque output, the motor tends to slow down, decreasing its counter-EMF as illustrated by the dashed waveform 61 in FIG. 2d. The voltage across capacitor 22 is accordingly decreased and the differential amplifier, sensing this decrease, operates to increase the current flowing through resistor 34. A negative going signal is accordingly applied to the base of transistor 38 increasing the collector current and causing capacitor 42 to charge at a faster rate as indicated by the waveform 62 in FIG. 2c. Accordingly, the firing potential of unijunction transistor 45 is reached earlier in the cycle causing SCR 18 to fire sooner, thus allowing more armature current to flow so that the motor speed is maintained.

While the positive potential $V_1$ has been illustrated as coming from a separate power supply it may be supplied from the pulsed line 48 if desired. To accomplish this a Zener diode may be connected from line 48 to circuit ground and selected to provide a potential equal to $V_1$. A capacitor is connected from line 64 to circuit ground. During the time interval between $T_1$ and $T_5$ diode 57 conducts to supply current to the capacitor and clamp line 64 to the potential supplied by the Zener diode. During the other phase of the line voltage diode 57 becomes reversed biased and the potential $V_1$ is supplied by the capacitor.

There have been illustrated and described a motor speed control for a D.C. motor which utilizes a variable sampling time for a switching device to obtain a D.C. signal representing the speed of the motor. Further, by sampling during the half-cycle in which power is to be supplied to the D.C. motor the entire other half-cycle is available to allow the inductive currents to decrease to an insignificant amount in the motor armature. Since these induction currents may be large under conditions of low torque requirements, this method of sampling is advantageous.

While the invention has been described in connection with a single preferred embodiment, it is to be understood that the specification describes only a preferred embodiment of the invention, that the invention is not limited thereto and that various modifications and variations therein may be made without departing from the scope of the invention as set forth in the appended claims.

What is claimed is:

1. A circuit for regulating the speed of a direct current motor comprising:
   input means for connection to a source of alternating current voltage;
   normally nonconductive switching means connected in series with the armature of said motor between said input means for providing a half-cycle wave to said armature;
   circuit means connected to said armature for developing a voltage proportional to the counter-EMF developed across said armature;
   signal comparison means having an output proportional to the difference between a pair of inputs;
   second switching means interconnecting said circuit means and one input to said signal comparison means;
   source means connected to the other of said pair of inputs of said signal comparison means for selecting a desired motor speed;
   control circuit means connected to receive the output of said signal comparison means and to control said first and second switching means;
   circuit means connecting said input means to said control circuit means, said control circuit means closing said second switching means at the beginning of each half-cycle wave of common polarity for sampling the counter-EMF of said armature and closing said first switching means at differing phases in said half-cycle in accordance with the deviation of said counter-EMF from a desired value;
   said control circuit opening said second switching means when said first switching means closes whereby the speed of said motor may be maintained substantially constant.

2. A circuit for regulating the speed of the direct current motor adapted to be connected to the source of alternating current comprising:
   a normally nonconductive first switching means for interconnecting the armature of said motor and said source for supplying current to said armature during half-cycle waves of said source having common polarity;
   pulse generating circuit means for generating a control pulse of duration substantially equal to said half-cycle wave;
   first circuit means connected to said armature for providing a signal proportional to the counter-EMF developed across said armature;
   signal comparison means having an output proportional to the difference between a pair of inputs;
   second switching means interconnecting said first circuit means to one of the inputs of signal comparison means;
   signal source means connected to the other input of said said signal comparison means for selecting a desired motor speed;
   control circuit means connected to said first and second switching means, said pulse generating circuit and to the output of said signal comparison means; said control circuit means rendering said second switching means conductive in response to the leading edge of said control pulse for connecting said signal proportional to said counter-EMF to said signal comparison means and rendering said first switching means conductive at varying times during said half-cycle wave in accordance with the deviation of the motor speed from a desired value; said control circuit rendering said second switching means nonconductive when said first switching means is rendered conductive.

3. The motor circuit of claim 2 wherein said control circuit includes:
   second switch control means connected to said second switching means and to said pulse generating circuit means; said control pulse biasing said second switch control means so as to render said second switching means conductive;
   storage capacitor means;
   circuit means interconnecting the output of said signal comparison means and said capacitor means and varying the rate of charging of said capacitor in accordance with said output;
   first switch control means connected to said capacitor, said first switching means, and to said second switch control means; said first switch control means operating, when the voltage on said capacitor reaches a predetermined value, to render said first switching means conductive and rendering the bias on said second switch control means provided by said control pulse ineffective therby to open said second switching means.

4. The motor circuit of claim 1 further comprising:
   circuit means connected to the field circuit of said motor and developing a signal proportional to the field flux in said field; and
   means connecting said field flux signal to said second switching means whereby speed variations due to changes in line voltage may be compensated.

5. The motor circuit of calim 3 further comprising:
   circuit means connected to the field circuit of said motor and developing a signal proportional to the field flux of said field; and
   means connecting said field flux signal to said second switching means whereby speed variations due to changes in line voltage may be compensated.

References Cited

UNITED STATES PATENTS

| | | | |
|---|---|---|---|
| 3,177,417 | 4/1965 | Wright | 318—331 |
| 3,373,331 | 3/1968 | Dow | 318—331 |
| 3,470,437 | 9/1969 | Douglass | 318—332 |

ORIS L. RADER, Primary Examiner

T. LANGER, Assistant Examiner